United States Patent [19]

Licary

[11] 4,366,943

[45] Jan. 4, 1983

[54] METHOD AND APPARATUS FOR INTRODUCING AIR INTO A VACUUM MILKING SYSTEM DURING THE WASHING CYCLE

[75] Inventor: Frank J. Licary, Madison, Wis.

[73] Assignee: DEC International, Inc., Madison, Wis.

[21] Appl. No.: 86,938

[22] Filed: Oct. 22, 1979

[51] Int. Cl.³ .......................... A01J 5/00; F16K 31/42
[52] U.S. Cl. ....................................... 251/30; 251/42; 251/44; 119/14.18; 137/DIG. 8
[58] Field of Search ................. 251/28, 30, 61.1, 121, 251/61, 61.2, 44, 45, 33, 42; 119/14.18, 14.41, 14.44; 137/613, 614.19, DIG. 8

[56] References Cited

U.S. PATENT DOCUMENTS

| | | | |
|---|---|---|---|
| 2,576,246 | 11/1951 | Taylor | 251/30 |
| 2,651,326 | 9/1953 | Ray | 251/30 |
| 3,019,764 | 2/1962 | Schilling | 119/14.18 |
| 3,100,002 | 8/1963 | Moore | 251/30 |
| 3,101,092 | 8/1963 | Seaborne | 137/613 |
| 3,167,093 | 1/1965 | George, Sr. | 119/14.41 |
| 3,506,034 | 4/1970 | Bronton | 119/14.18 |

Primary Examiner—A. Michael Chambers
Attorney, Agent, or Firm—Michael, Best & Friedrich

[57] ABSTRACT

A valve assembly including a first housing member having a flange and a second housing member having a flange. The first housing member is connected to the vacuum milking system. A flexible diaphragm is mounted between the flanges of said first and second housing members. The diaphragm is movable between an unflexed position and a flexed position in response to forces exerted on opposite sides thereof. A control valve is operable to selectively place the second housing member in communication with the atmosphere wherein the diaphragm is forced to assume its unflexed position and to periodically place the second housing member in communication with the vacuum in the vacuum line to thereby force the diaphragm to assume its flexed position. A valve member is mounted on the diaphragm and is operable to place the first housing in communication with the atmosphere when the diaphragm is in its flexed position to thereby admit air into the vacuum line. The valve is further adapted to cutoff the first housing from the atmosphere when the diaphragm is in its unflexed position.

6 Claims, 5 Drawing Figures

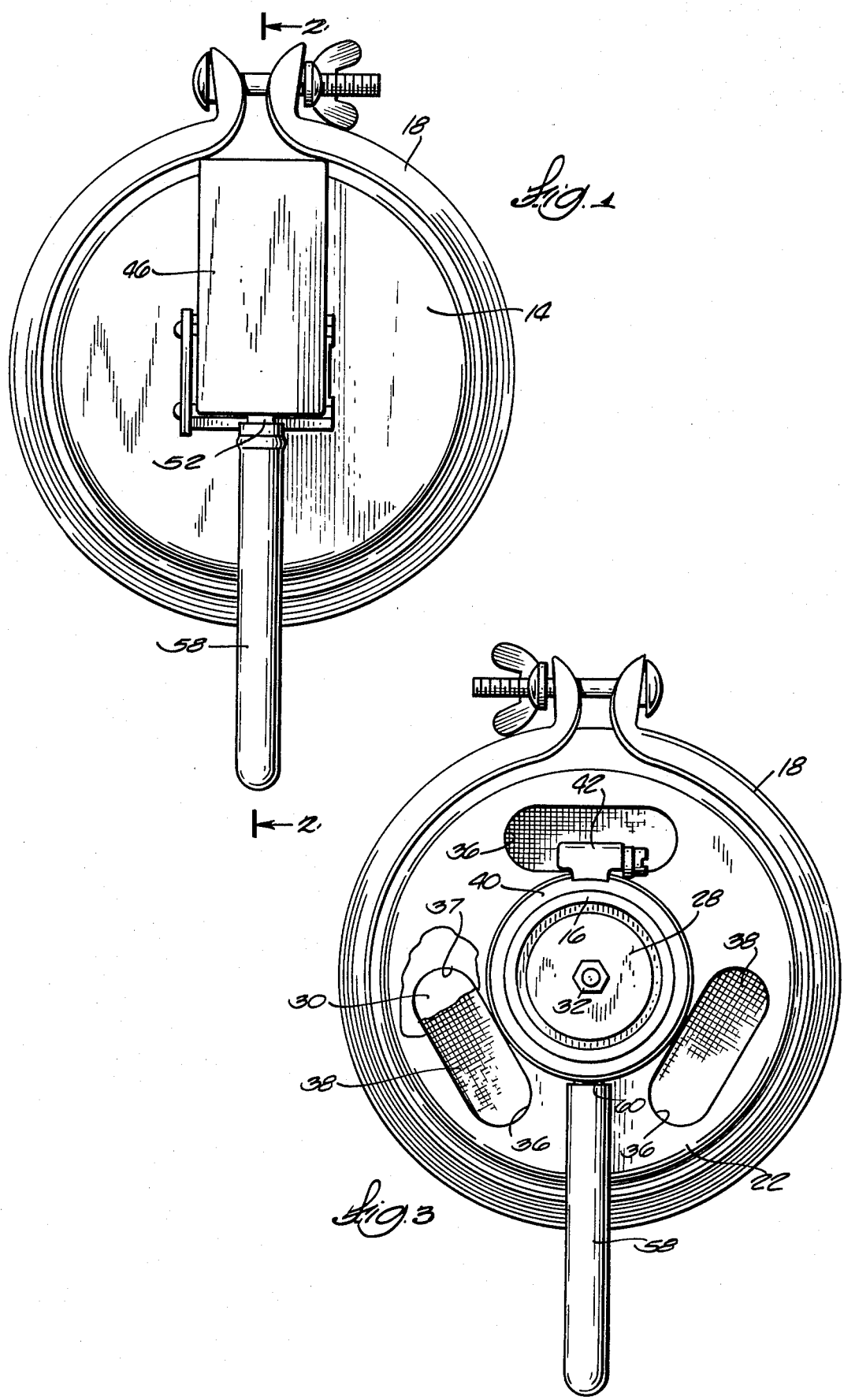

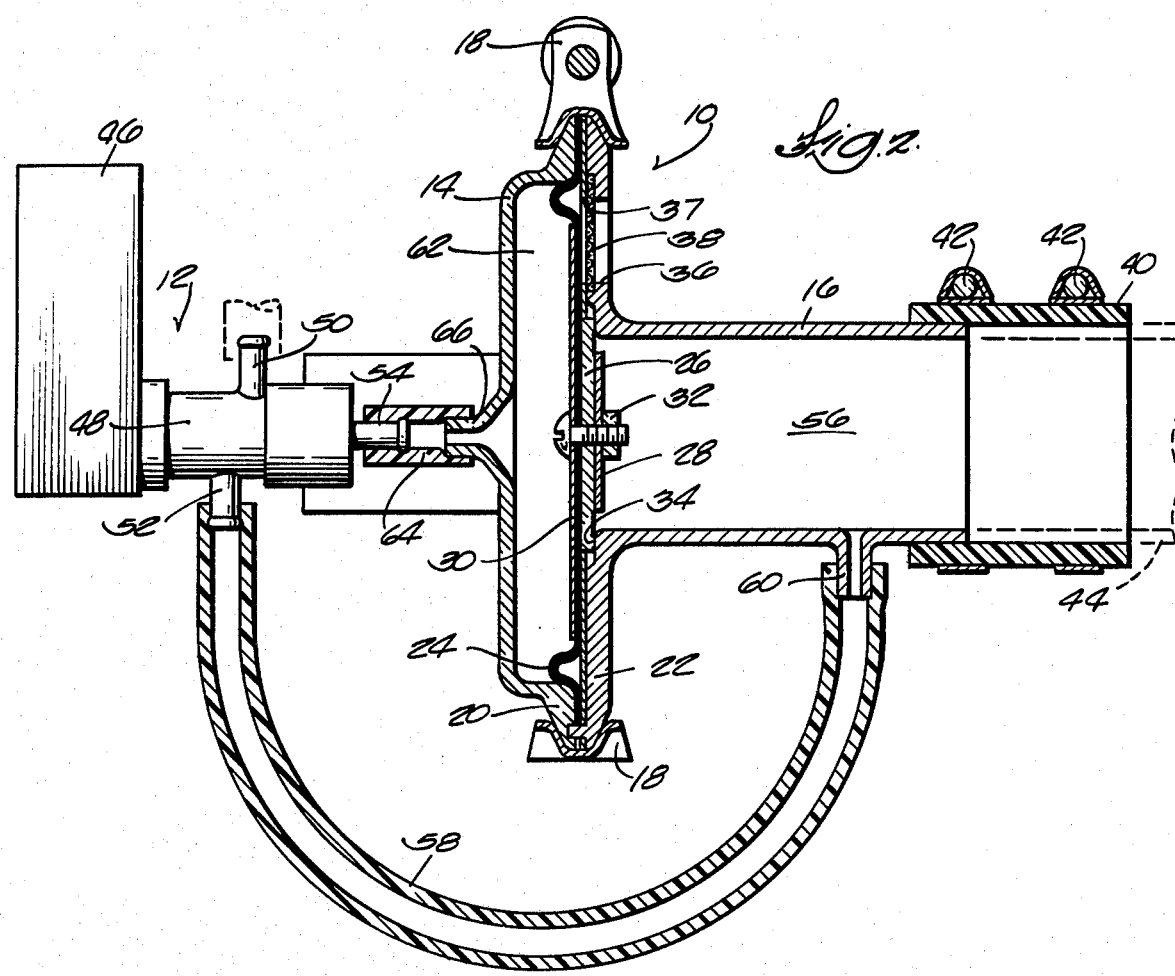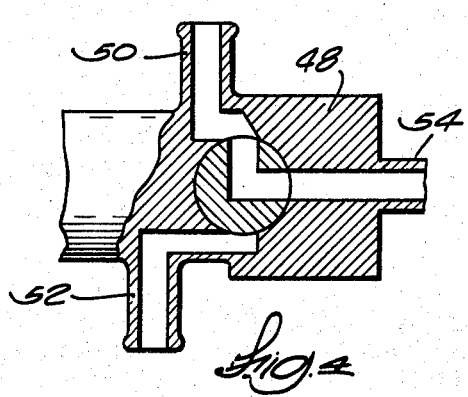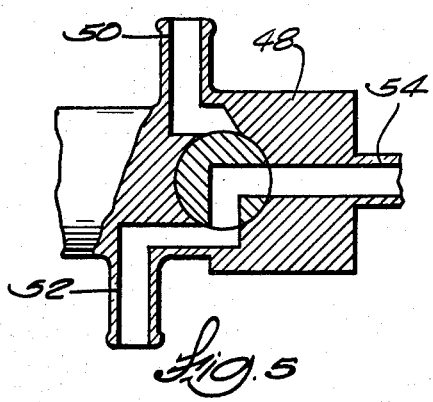

METHOD AND APPARATUS FOR INTRODUCING AIR INTO A VACUUM MILKING SYSTEM DURING THE WASHING CYCLE

FIELD OF THE INVENTION

This invention relates to a valve assembly and more particularly to a method and apparatus for introducing air into a vacuum milking system during the washing cycle.

DESCRIPTION OF THE PRIOR ART

A patentability search directed to the present invention uncovered the following U.S. Pat. Nos. 3,506,034, 3,913,884, 3,957,244, 3,981,478, 3,961,608.

The apparatus shown in prior art U.S. Pat. No. 3,506,034 represents an example of an apparatus used for introducing air into a vacuum milking system of a type which was in common use prior to the present invention.

The principal advantages of the present apparatus over valves like that shown in prior U.S. Pat. No. 3,506,034 are its substantially longer service life, quieter operation, larger air flow capacity, easy disassemble for cleaning, and its ease of adjustability.

SUMMARY OF THE INVENTION

A valve assembly comprising a first housing member having a first interior chamber with said housing member adapted for connection to a vacuum line. A second housing member having a second interior chamber is provided. A flexible diaphragm is mounted between first and second housing members and is adapted to move between an unflexed position and a flexed position in response to forces exerted on opposite sides thereof. A control valve for controlling the operation of the valve assembly is provided. Such control valve is operable to selectively place the second interior chamber in communication with the atmosphere to thereby force the diaphragm to assume its unflexed position. The control valve also operates to periodically to place the second interior chamber in communication with the vacuum in the first interior chamber to thereby force the diaphragm to assume its flexed position. A valve member is mounted on the diaphragm and operable to place the first interior chamber in communication with the atmosphere when the diaphragm is in its flexed position to thereby admit air into the vacuum line. The valve member is further adapted to cut off the first interior chamber from the atmosphere when the diaphragm is in its unflexed position.

BRIEF DESCRIPTION OF THE DRAWINGS

FIG. 1 is a top plan view of an air injector assembly made in accordance with the present invention;

FIG. 2 is a sectional view taken along line 2—2 of FIG. 1;

FIG. 3 is a bottom plan view of the air injector assembly shown in FIGS. 1 and 2; and FIGS. 4 and 5 are schematic views of the three-way control valve.

DESCRIPTION OF THE PREFERRED EMBODIMENT

Referring to the drawings in detail, the air injector assembly of the present invention is comprised of two basic components, namely, a diaphragm air valve assembly 10 and a solenoid operated three-way control valve 12.

Diaphragm valve 12 is comprised of a first housing member 14 and a second housing member 16 removably secured together by a clamp member 18. Clamped between flanges 20 and 22 of housing members 14 and 16 is a flexible diaphragm member 24. A rubber valve disc member 26 is mounted on the central portion of diaphragm 24 by means of a washer 28, a backup plate 30, and a nut and bolt assembly 32.

As will be explained in detail hereinafter, valve member 26 is adapted to move into and out of sealing engagement with a seat 34 formed in the face of flange 22 of housing 16. A plurality of openings 36 are provided in flange 22 as best shown in FIG. 3. Screen members 38 are mounted in recesses in the face of flange 22 opposite openings 36 to prevent foreign objects such as insects from entering the system. A thin metal plate 37 is mounted between diaphragm 24 and flange 22. Plate 37 has openings therein corresponding in size, shape and location with openings 36 in flange 22. The purpose of plate 37 will be explained in detail hereinafter.

A plastic tube 40 with adjustable clamps 42, 42 is mounted on the open end of housing 16 to facilitate connection of the air injector assembly to the wash line 44 of the milking system.

Control valve 12 is comprised of a solenoid operator 46 and a valve body 48 having ports 50, 52 and 54. Port 50 is opened to the atmosphere. Port 52 is connected to the interior chamber 56 in housing member 16 by means of a tube 58 and a nipple 60 on the side of housing 16. Port 54 is connected to internal chamber 62 in housing member 14 by means of a tube 64 and a nipple 66 on the end of housing 14.

The internal construction of three-way control valve 12 can be of any conventional design to accomplish the desired function, namely; with solenoid 46 deenergized (FIG. 4) port 54 will be in communication with the atmosphere thru port 50 and port 52 will be closed; and when solenoid 46 is energized (FIG. 5) port 52 will be in communication with port 54 and port 50 will be closed.

As indicated previously, while the injector assembly of the present invention may have a variety of uses it is particularly designed for use in a milking system wherein the milk lines are subjected to a vacuum during normal operation. In such a system it is desirable to periodically inject a volume of air into the system during the washing cycle to insure thorough contact of the cleaning liquid with the interior surfaces of the milking system.

With solenoid 46 deenergized (FIG. 4) port 54 of valve 12 will be in communication with the atmosphere through port 50 which in turn will place chamber 62 in housing 14 in communication with the atmosphere. At the same time port 52 will be closed and chamber 56 in housing 16 will be subjected to the vacuum in the system (through line 44) which in a typical system would be approximately 15 inches of Hg. With atmospheric pressure in chamber 62 and 15 inches Hg. of vacuum in chamber 56 the pressure differential across diaphragm 24 will hold valve disc 26 firmly in sealing engagement with valve seat 34, thus, preventing atmospheric air to be injected into the system through openings 36.

When it is desired to inject a volume of air into the system, solenoid 46 of valve 12 is energized. This can be accomplished by any suitable means such as a timer or manually if desired. As shown in FIG. 5, this will place port 52 of the valve into communication with port 54 and at the same time close atmospheric port 50. This in turn will place chamber 56 in communication with chamber 62 through tubes 58 and 64 to thus create a vacuum in chamber 64 equal to that in chamber 56.

Since the effective surface area of the chamber 62 side of diaphragm 24 is greater than that on the chamber 56 side of the diaphragm the unequal forces exerted on opposite sides of the diaphragm will cause it to move to the left into space 62 as viewed in FIG. 2. Valve disc 26 will thereby be moved out of engagement with seat 34 allowing air from atmosphere to be injected into the vacuum system through openings 36 in flange 22 (openings in plate 37) and then valve member 26 and into chamber 56. By rotating plate 37 with respect to flange 22 the overall opening area into chamber 56 can be adjusted.

By varying the overall opening area into chamber 56 from the atmosphere the flow of air from the atmosphere into the vacuum system can be adjusted for any particular vacuum level in the system. The plate is rotated by simply loosening nut and bolt assembly 32 and adjusting the openings to the desired size. The air introduced into the vacuum system creates turbulence in the washing solution passing through the pipe line to increase the velocity of the solution and thereby increase the cleaning action.

It will be appreciated from the foregoing that the apparatus of the present invention having no moving parts except the flexing diaphragm will have a relatively long service life and will also operate in a relatively quite manner.

I claim:

1. A valve assembly comprising:
   a first housing member (16) having a first interior chamber therein (56) and a flange (22), said first housing member adapted for connection to a vacuum line;
   a second housing member (14) having a second interior chamber therein (62) and a flange (20);
   a flexible diaphragm means mounted between the flanges of said first and second housing members and positioned with one side facing said first interior chamber and with the other side facing said second interior chamber, said diaphragm adapted to move between an unflexed position and a flexed position in response to forces exerted on opposite sides thereof, the effective surface area of said diaphragm means facing said second interior chamber being greater than the effective surface area facing said first interior chamber;
   valve means (26) mounted on said diaphragm means to place said first interior chamber in communication with the atmosphere through a plurality of openings (36) in said first housing flange when said diaphragm is in its flexed position and to cut off said first interior chamber from the atmosphere when said diaphragm means is in its unflexed position; and
   a control valve means (12) operable to selectively place said second interior chamber in communication with the atmosphere wherein said diaphragm means is forced to assume its unflexed position and to alternatively place said second interior chamber in communication with the vacuum in said first interior chamber wherein said diaphragm means is forced to assume its flexed position.

2. A valve assembly according to claim 1 in which said control valve means is comprised of a solenoid operator (46) and a valve body (48) having a first port (50) open to the atmosphere, a second port (52) connected to said first interior chamber, and a third port (54) connected to said second interior chamber, said control valve means further including a three-way valve mechanism in said body portion in which is operable when said solenoid operator is deenergized to place said third port in communication with the atmosphere through said first port and to simultaneously close said second port, said control valve means being further operable when said solenoid is energized to place said second port in communication with said third port and to simultaneously close said first port.

3. A valve assembly according to claim 1 in which said second port is connected to said first interior chamber by a tubular member.

4. A valve assembly according to claim 1 in which said third port is connected to said second interior chamber by a tubular member.

5. A valve assembly comprising:
   a first housing member (16) having a first interior chamber therein (56) and a flange (22), said first housing member adapted for connection to a vacuum line;
   a second housing member (14) having a second interior chamber therein (62) and a flange (20);
   a flexible diaphragm means mounted between said flanges of said first and second housing members and positioned with one side facing said first interior chamber and with the other side facing said second interior chamber, said diaphragm adapted to move between an unflexed position and a flexed position in response to forces exerted on opposite sides thereof, the effective surface area of said diaphragm means facing said second interior chamber being greater than the effective surface area facing said first interior chamber;
   valve means (26) mounted on said diaphragm means to place said first interior chamber in communication with the atmosphere through a plurality of openings (36) in said first housing flange when said diaphragm is in its flexed position and to cut off said first interior chamber from the atmosphere when said diaphragm means is in its unflexed position; an adjustment plate (37) mounted adjacent said first housing flange and having a plurality of openings therein in which are spaced and sized approximately the same as said openings in said first housing flange so that when said adjustment plate is rotated with respect to said flange the effective size of the openings through said flange and plate will be varied; and
   a control valve means (12) operable to selectively place said second interior chamber in communication with the atmosphere wherein said diaphragm means is forced to assume its unflexed position and to alternatively place said second interior chamber in communication with the vacuum in said first interior chamber wherein said diaphragm means is forced to assume its flexed position.

6. A valve assembly according to claim 5 in which said control valve means is comprised of a solenoid operator (46) and a valve body (48) having a first port (50) open to the atmosphere, a second port (52) connected to said first interior chamber, and a third port (54) connected to said second interior chamber, said control valve means further including a three-way valve mechanism in said body portion which is operable when said solenoid operator is deenergized to place said third port in communication with the atmosphere through said first port and to simultaneously close said second port, said control valve means being further operable when said solenoid is energized to place said second port in communication with said third port and to simultaneously close said first port.

* * * * *